United States Patent
Filatov et al.

(10) Patent No.: US 9,282,112 B2
(45) Date of Patent: Mar. 8, 2016

(54) SYSTEM AND METHOD FOR DETERMINING CATEGORY OF TRUST OF APPLICATIONS PERFORMING INTERFACE OVERLAY

(71) Applicant: Kaspersky Lab ZAO, Moscow (RU)

(72) Inventors: Konstantin M. Filatov, Moscow (RU); Olga O. Inozemtseva, Moscow (RU); Victor V. Yablokov, Moscow (RU)

(73) Assignee: Kaspersky Lab AO, Moscow (RU)

( * ) Notice: Subject to any disclaimer, the term of this patent is extended or adjusted under 35 U.S.C. 154(b) by 0 days.

(21) Appl. No.: 14/498,224

(22) Filed: Sep. 26, 2014

(65) Prior Publication Data

US 2016/0036834 A1    Feb. 4, 2016

(30) Foreign Application Priority Data

Aug. 1, 2014  (RU) .................. 2014131808

(51) Int. Cl.
H04L 29/06  (2006.01)
(52) U.S. Cl.
CPC .................. *H04L 63/1408* (2013.01)
(58) Field of Classification Search
CPC ............ H04L 63/1416; H04L 63/1441; H04L 63/1408
USPC ......................................................... 726/22
See application file for complete search history.

(56) References Cited

U.S. PATENT DOCUMENTS 7,383,581 B1 *  6/2008 Moore .................. G06F 21/563
                                                              726/24
8,205,260 B2   6/2012 Obrect et al.
9,143,529 B2 *  9/2015 Qureshi .................. H04L 63/20
2006/0277605 A1  12/2006 Curtis et al.
(Continued)

FOREIGN PATENT DOCUMENTS

EP      2202662 A1   6/2010
RU       103643 U1   4/2011

OTHER PUBLICATIONS

Screenmilker: How to Milk Your Android Screen for Secrets Chia-Chi Linl, Hongyang Lil, Xiaoyong Zhou, XiaoFeng Wang Department of Computer Science, University of Illinois at Urbana-Champaign; School of Informatics and Computing, Indiana University at Bloomington {1in36, hli52} @illinois.edu, {zhou, xw7}@indiana.edu.

*Primary Examiner* — Kambiz Zand
*Assistant Examiner* — Benjamin Kaplan
(74) *Attorney, Agent, or Firm* — Arent Fox LLP; Michael Fainberg (57) ABSTRACT

Disclose dare systems and method for determining category of trust of software applications. An example method includes monitoring a first application to detect an overlay of at least one interface element of the first application by at least one interface element of a second application; collecting information about the second application, wherein the information includes at least a danger status of the second application, wherein the danger status determines a danger caused by the second application to the first application; determining a category of trust of the second application based on an analysis of the collected information; and determining, based on the category of trust of the second application, whether to allow or prohibit overlay of the at least one interface element of the first application by the at least one interface element of the second application.

15 Claims, 5 Drawing Sheets

(56) References Cited

U.S. PATENT DOCUMENTS

| | | | |
|---|---|---|---|
| 2007/0220007 A1* | 9/2007 | Narita | G06F 21/31 |
| 2008/0289047 A1* | 11/2008 | Benea | G06F 21/64 |
| | | | 726/27 |
| 2009/0165136 A1 | 6/2009 | Obrecht et al. | |
| 2011/0141124 A1* | 6/2011 | Halls | G06F 21/57 |
| | | | 345/522 |
| 2012/0192277 A1 | 7/2012 | Jakobson et al. | |
| 2013/0019310 A1 | 1/2013 | Ben-Itzhak et al. | |
| 2013/0328902 A1 | 12/2013 | Grant | |
| 2015/0143452 A1* | 5/2015 | Hamlen | G06F 21/51 |
| | | | 726/1 |

* cited by examiner

SYSTEM AND METHOD FOR DETERMINING CATEGORY OF TRUST OF APPLICATIONS PERFORMING INTERFACE OVERLAY

CROSS-REFERENCE TO RELATED APPLICATIONS

The present disclosure claims benefit of priority under 35 U.S.C. 119(a)-(d) to a Russian Application No. 2014131808 filed on Aug. 1, 2014, which is incorporated by reference herein.

FIELD OF TECHNOLOGY

The disclosure relates generally to the field of computer security and in particular to systems and methods for determining category of trust of software applications performing interface overlay.

BACKGROUND

The growth of online commerce and other Internet services, the use of applications for accessing services requiring the entry of confidential data has taken on massive proportions. This typically occurs when a user is paying for products and services, or accessing services requiring entry of registration data. Payment with the use of banking applications is done in similar ways on PCs and mobile devices. As a result of the developments of this field, malicious software has appeared, which may steal a user's confidential data that is used for paying for products and services, and also for registering for services and resources on the Internet.

One of the ways of stealing data entered by a user is to overlay an interface of a malicious application over the interface of a legitimate web page or application through which the payment or registration is attempted. For example, a program created by a hacker may overlay a number of registration fields such that the user enters data not in the original registration field, but in the interface element provided by the hacker's program.

The antivirus industry has been called upon to protect the user against such malicious programs, and the solution to this problem may include the creation of various systems, which make it possible to track down the moment when the interface of a protected application is overplayed by the interface of a malicious program. An analysis of known solutions indicates that these solutions are unable to protect against partial overlay of the window of a protected application without affecting the window of the protected application (closing the window, changing its size, and so on) and its process (e.g., intrusion into an active process).

SUMMARY

Disclosed are systems, methods and computer program products for determining category of trust of software applications performing interface overlay.

In one aspect, an example method for determining category of trust of software applications, comprises: monitoring, by a hardware processor, a first application to detect an overlay of at least one interface element of the first application by at least one interface element of a second application; collecting information about the second application, wherein the information includes at least a danger status of the second application, wherein the danger status determines a danger caused by the second application to the first application; determining a category of trust of the second application based on an analysis of the collected information; and determining, based on the category of trust of the second application, whether to allow or prohibit overlay of the at least one interface element of the first application by the at least one interface element of the second application.

In one example aspect, the monitoring of the first application may comprise: detecting an overlay of at least one active interface element of the first application by the at least one interface element of the second application; and detecting the overlay by comparing information relating to a window of the first application with information relating to an active window in a system log of an operating system.

In one example aspect, the danger to the first application caused by the second application may include at least one of: stealing of data being processed by the first application and replacing of the data being inputted by a user into the first application.

In one example aspect, the analysis of the collected information may comprise: determining the second application as trusted when the second application has a safe status; and determining the second application as untrustworthy when the second application has a dangerous status.

In one example aspect, analysis of the collected information may comprise: determining whether the second application is a system applications; and when the second application is a system application, determining the second application as trusted.

In one example aspect, the analysis of the collected information may comprise: determining that the danger status of the second application is unknown; collecting information about characteristics of the second application; comparing the collected information about characteristics of the second application with information about forbidden and safe characteristics for known applications; and determining a category of trust of the second application based on the comparison.

In one example aspect, comparing the collected information about characteristics of the second application with information about forbidden and safe characteristics for known applications may include: determining a degree of similarity between characteristics of the second application and the forbidden and safe characteristics.

In one aspect, an example system for determining category of trust of software applications, comprises a hardware processor configured to: monitor a first application to detect an overlay of at least one interface element of the first application by at least one interface element of a second application; collect information about the second application, wherein the information includes at least a danger status of the second application, wherein the danger status determines a danger caused by the second application to the first application; determine a category of trust of the second application based on an analysis of the collected information; and determine, based on the category of trust of the second application, whether to allow or prohibit overlay of the at least one interface element of the first application by the at least one interface element of the second application.

In one aspect, an example computer program product, stored on a non-transitory computer-readable storage medium, comprises computer-executable instructions for determining category of trust of software applications, including instructions for: monitoring a first application to detect an overlay of at least one interface element of the first application by at least one interface element of a second application; collecting information about the second application, wherein the information includes at least a danger status of the second application, wherein the danger status determines a danger caused by the second application to the first application; determining a category of trust of the second application based on an analysis of the collected information; and determining, based on the category of trust of the second application, whether to allow or prohibit overlay of the at least one interface element of the first application by the at least one interface element of the second application.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for determining category of trust of software applications performing interface overlay according to one aspect. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

As used herein, an interface refers to the graphic user interface (GUI), which may include a variety user interfaces elements (e.g., menu, buttons, icons, lists, and so on), where various interface elements that are shown to the user on a display may be implemented in the form of graphic images.

Figure 1:
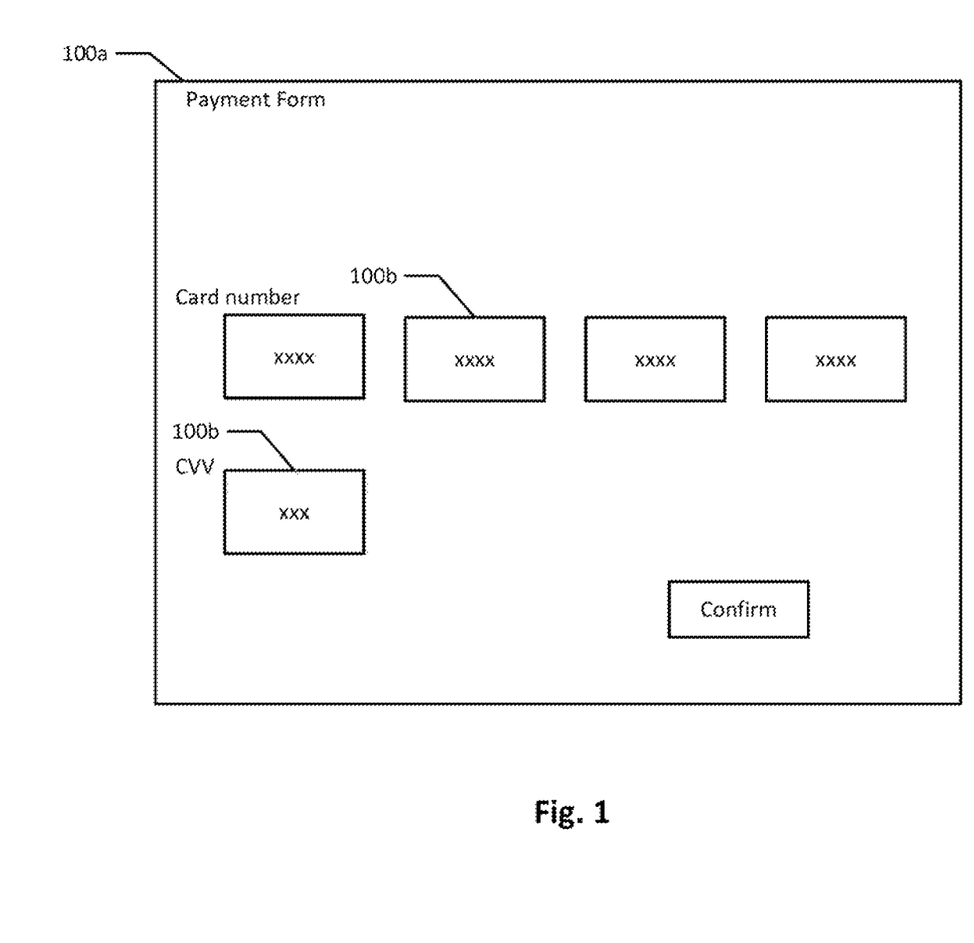
FIG. 1 shows an example of a graphic interface for a banking application for payment for purchases or services according to one aspect.

The Interface elements may include, but not limited to:
button
split button—a button calling up a list with secondary action(s) (buttons)
radio button
flag button (check box)
icon
list (list box)
tree view (hierarchical list)
combo box, drop-down list
label
textbox, edit field
element for displaying table data (grid view)
menu
main menu or menu bar
popup menu
pull down menu
window
dialog box
modal window
panel
tab
toolbar
scrollbar
slider
status bar
tooltip, hint FIG. 1 shows an example of a graphic interface of a banking application for payment for purchases or services. In one example aspect, a malicious application may entirely overlay the graphic interface of the banking application with the malicious application's own interface. In another example aspect, the malicious application may overlay one or more individual elements of the interface of the banking application, such as a data field for entry of a credit card number 100*b* and the CVV code. A window 100*a* of the malicious application may be invisible, while it is active but not displayed to the user. In all the described cases, the user may enter his or her confidential data not in an original interface of the banking application, but in the interface elements 100 created by the malicious application. The malicious application, in order to perform the replacement of the original interface, may track the working of applications of interest, such as applications working with banking services, and at the instant of launching or during periods of operation of these applications it may overlay the interface elements 100 of the banking application with its own interface elements.

Figure 2:
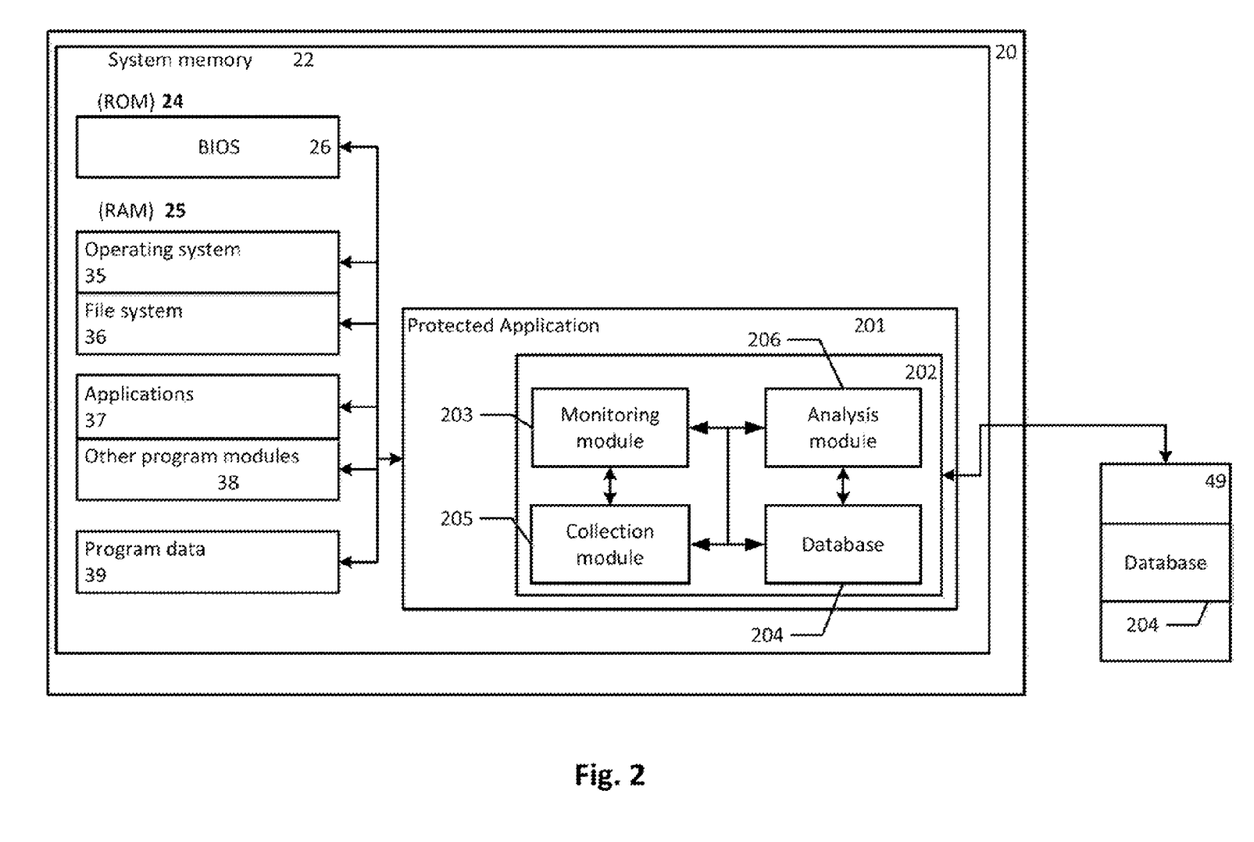
FIG. 2 illustrates a block diagram of an example system for determining category of trust of software applications performing interface overlay according to one aspect.

To protect against the above-described interface overlay attack, an application (i.e., a protected application) may include a protection system (an example of which is illustrated in FIG. 2), which is configured to detect the fact of an overlay of its own interface elements 100. The detecting may be done in various ways. In one example aspect, the protected application at the time of its activity (e.g., the user is entering data or working with the interface) may constantly poll the system to determine whether its window is on top of all other windows and other interface elements, i.e., whether its window is active. In this context, it is the interface element of the application with which the user is working, which is understood as being active. In another example aspect, the protected application may receive a communication from the system indicating that an interface element of an application other than the protected application is on top of it (i.e., the window of the protected application is no longer active), and the window of the protected application may be considered to be overlaid. Subsequently, it may be further possible to determine the coordinates of the interface elements that may have overlaid the protected application, their visibility, and so on. In yet another example aspect, the fact of interface overlay may be determined by tracking the events of the system related to the creation or activation of interface elements, and if these events have been initiated by an application other than the protected application, the interface of the protected application may be considered to be overlaid. For example, the appearance in the system of the event EVENT_SYSTEM_FOREGROUND (http://msdn.microsoft.com/en-us/library/windows/desktop/dd318066%28v-vs.85%29.aspx) may indicate that the active window has been overlaid. The protected application may also determine an overlay by tracking the appearance of windows with a certain header, such as the header KasperskyBank.

It should be acknowledged that the interface overlay may be performed not only by a malicious application, but also by a safe application. Identification of the application performing the interface overlay may be done in several ways. In one example aspect, the protected application may determine an identifier of a process via a handle of the interface element performing the overlay, i.e., one may obtain the handle of the interface element performing the overlay, and with the handle of the interface element one may obtain the identifier of the process which created the window. Knowing the identifier of the process, the protected application may determine the process itself and the application that created it. In another example aspect, in an operating system of Android type, for example, the system may track down events in a system log of the Android OS (logcat). As the activation of a window of any application may be recorded by the operating system in a logcat, the system log may be analyzed and the protected application may determine the application whose window is now active. An example of the records of a system log with the described information may be presented below:

```
I/ActivityManager( 445): No longer want
com.google.android.inputmethod.latin.dictionarypack
(pid 25679): empty #17
W/WFApp ( 2479): onTrimMemory(20) called
V/AudioHardwareMSM8660( 129): open driver
I/ActivityManager( 445): START u0 {act=android.intent.action.MAIN
cat=[android.intent.category.LAUNCHER] flg=0x10200000
cmp=com.android.settings/.Settings} from pid 727
V/AudioHardwareMSM8660( 129): get config
V/AudioHardwareMSM8660( 129): set config
V/AudioHardwareMSM8660( 129): buffer_size: 4800
```

From the record, the protected application may determine the identifier of the process (pid 727), then from the process identifier the application performing interface overlay may be determined. The application manifest may also be analyzed, and in one example aspect, an antivirus software may be activated to scan the application manifest for presence of malware.

After identifying the particular application performing the interface overlay, one may obtain information about the application. The information may include various characteristics of the application and its different components (e.g., files, interface elements, and so on). The information about the application may help one conclude as to the degree of trust of the application. In one example aspect, the information may include a hash sum of the application or that of individual files, as well as that of the installer, the application version, the application name, the application source, size, the path to the application on the device, the types of resources of the application and their hash sums and histograms, and so on. These are the actual characteristics which may be collected directly from the device. In another example aspect, statistical characteristics may be obtained on the basis of the actual characteristics by checking against an external or internal database for information indicating a danger status of the application or an individual file of the application stored in a reputational database (e.g., a database storing danger evaluations for objects, particularly files), the number of installations of the application around the world or in a particular region, and so on. The obtained actual and statistical characteristics may be used for a subsequent analysis of the application. Alternatively and independently, one may identify the actual characteristics of the application by characterizing the resources of the application, especially the interface elements of the application (buttons, windows). These characteristics may include the shape of the window, the header of the window, the name of the button, and so on. The information about the interface elements may be obtained, for example, in the form of hash sums and histograms.

Additionally, the information obtained may be used to determine a category of trust of the application performing the interface overlay. The category of trust of an application refers to the degree of trust in the application (trusted or untrustworthy) in terms of the protection system of the protected application (to be described fully below). In one example aspect, there may be two categories of applications: trusted applications and untrustworthy applications. In the context of the present disclosure, the concept of the category of trust of an application is distinct from the concept of a danger status of an application. The status of an application in the context of the present disclosure may be dangerous, or safe. There are also unknown applications—these are applications whose status has not been determined. The danger status of an application may determine the danger of the application performing the interface overlay caused to the protected application. The danger of an application performing the overlay to the protected application may include, for example, the stealing of data being processed by the protected application and/or replacement of data.

Trusted applications may include applications whose interface overlay of the protected application is safe in the view of the protection system. The protection system of a protected application is configured to assign a category of trust to an application. It may do so locally, in the context of the current condition on the device and based on the information about the application whose interface elements have overlaid the interface elements of the protected application. In one example aspect, this information may indicate the status of the application performing the interface overlay. The status of an application may be general, i.e., used when checking applications for malware in various contexts (such as when performing a total-disk checking of a device for malicious software) or particular, i.e., the status is current only when determining the category of an application during interface overlay. The status may also be even more particular and pertain only to certain types of applications when determining their category, for example, the application performing the overlay has a dangerous status only during an analysis by the protection system of a protected banking application, for other types of protected applications (e.g., gaming, email, and so on) the application performing the overlay has a safe status. In another example aspect, the type of the application may be determined by its purpose. The status of the application may be determined by using a hash sum of the application or that of a particular file of the application. For example, one may submit a query to a reputational database for investigation. The reputational database may reside on the device or on a remote server. If the investigated application is known (the hash sum is stored in the reputational database), then, accordingly, the application performing the overlay may already have a safe or dangerous status, depending on which hash sum in the reputational database the investigated hash sum of the application corresponds to. If the hash sum of the application or that of an individual file of the application is not contained in the database, the application or the individual file of the application may be considered to be unknown, i.e., the application performing the overlay may not have a status. If the application or the file has a safe status, the application performing the overlay may be assigned a trusted category. In another example aspect, the category of the application may be determined from other actual and statistical information about the application including, for example, its installation path on the device or its being part of the preinstalled system applications. If the application is a system application (as indicated by the installation path), while its status may be unknown, the application may be considered to be trusted.

An application performing the interface overlay may be assigned a status at the same time as its determined trust category. For example, a comparison of the interface elements of the protected application may be carried out against the interface elements of the application performing the overlay, and if the elements are found to be similar, the application performing the overlay may be assigned a dangerous status. In another example aspect, information about the interface elements of the application performing the overlay may be compared against information on the interface elements of applications contained on a black list. The black list may contain information about interface elements that may be forbidden to overlay the interface elements of protected applications. Such elements may include buttons entitled "enter code", windows with headers containing the word "Bank", and so on. The black list may reside on a local device, or remotely. In yet another example aspect, the black list may be structured according to the type of protected application. For example, the protected application may pertain to banking applications and a substitute of the overlay of the protected application by a window containing the name of a bank in its header may be dangerous, and so such a window will be on the black list for banking applications. In another example, the protected application may pertain to gaming, and the overlay of its window by a window containing the name of a bank in the header may be safe and it will not be found on the black list. Further, the black list may contain at least the characteristics of interface elements which may include copies of the interface elements of the protected application.

FIG. 2 illustrates a protection system 202 for determining category of trust of software applications performing interface overlay of a protected application 201. The protection system 202 may be part of the protected application 201. The application 201 itself, including all components thereof, may be stored in the system memory 22 of a user device 20. The protection system 202 may include a monitoring module 203 configured to detect an overlay of the interface elements of the protected application by the interface elements of another application. The monitoring module 203 may be connected to a database 204, which may store information about the status of applications installed on the device 20 and a list of forbidden interface elements, and it may reside remotely on a remote computer server 49. The monitoring module 203 may be also connected to a collection module 205 configured to collect information on the application performing the interface overlay. The monitoring module 203 and the collection module 205 may be connected to an analysis module 206, which is configured to analyze the information collected by the collection module 205. As a result of the analysis of the collected information, the analysis module 206 may determine a category of trust of the application performing the overlay. The analysis module 206 may also determine the danger status of the application performing the overlay. In one example aspect, all modules of the protection system 202 of the protected application may be connected to the software and hardware of the device 20 (such as one shown in FIG. 5), and may thus perform configuration and modification of the operating system 35, under whose control the device 20 is working, and of the file system 36, the applications 37, and other components stored in the system memory 22, and also a configuration of the components of the hardware of the device.

Figure 3:
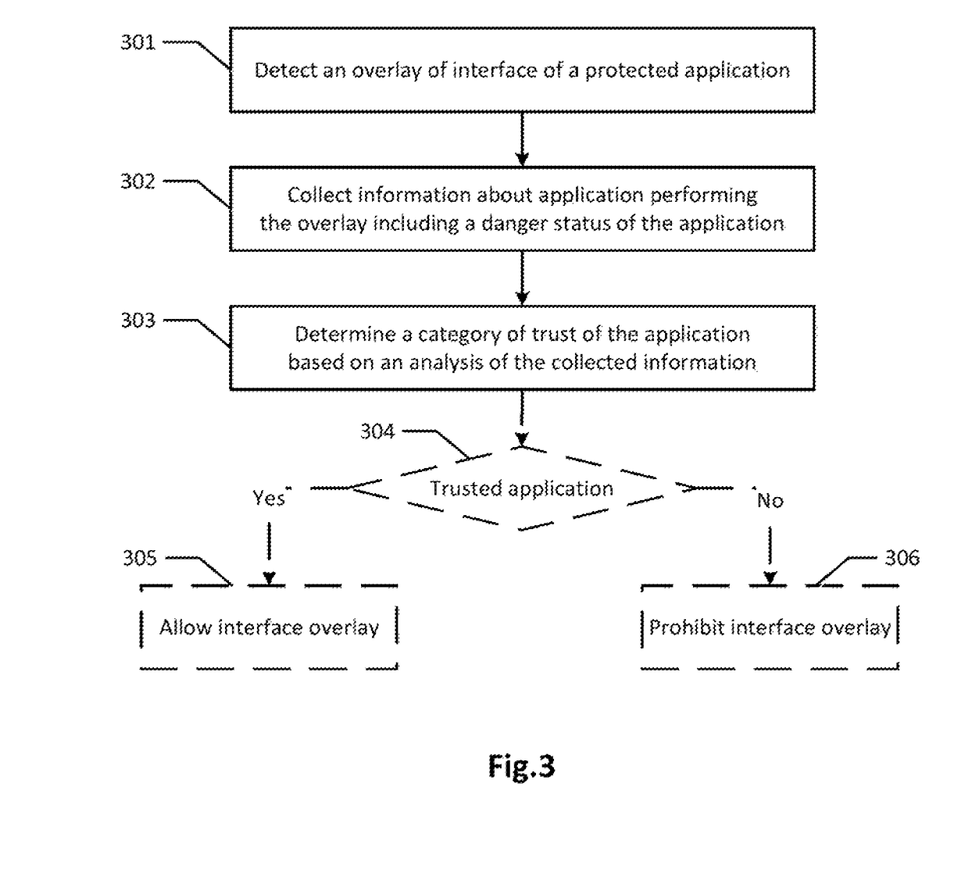
FIG. 3 illustrates a flow diagram of an example method for determining category of trust of software applications performing interface overlay according to one aspect.

FIG. 3 shows one example method for determining category of trust of software applications performing interface overlay according to one aspect. In step 301, the protected application may detect an overlay of one of the active elements of its interface (the element with which the user is currently interacting), by at least one interface element of another application. In one example aspect, the overlay may be detected by comparing information about the window of the protected application with information about the active window in the system log of the operating system. Next, in step 302, the protected application may collect information about the application performing the overlay, where the information may include at least a status of the application, which may be stored in the database 204. The collected information may be analyzed in step 303, and on the basis of the analysis, a category of trust of the application performing the overlay may be determined. In one example aspect, the application may be recognized as untrustworthy if the status of the application is "dangerous" and on the other hand the application may be recognized as trusted if the status of the application is "safe". In the event that the status of the application may be unknown, additional information about the application may be collected including, for example, whether the application performing the overlay belongs to the category of preinstalled system applications, which may be considered to be trusted. As indicated above, the status may be used only for determining the category of trust of an application performing an interface overlay of a protected application, and in another example aspect, the status may be used only for the protection system of that type of applications which correspond to the type of protected application 201 for whom protection system 202 established the status previously. Next, if the application is determined to be trusted, in step 304, the protected application may allow, in step 305, the overlay of its interface by the interface of the trusted application. However, if, in step 304, the application is determined to be untrustworthy, the protected application may prohibit, in step 306, the overlay of its interface by the interface of the untrustworthy application (e.g., the interface of the protected application will remain on top), and/or a user notification message may be displayed notifying the user that another application overlaid it's interface over the interface of the protected application.

Figure 4:
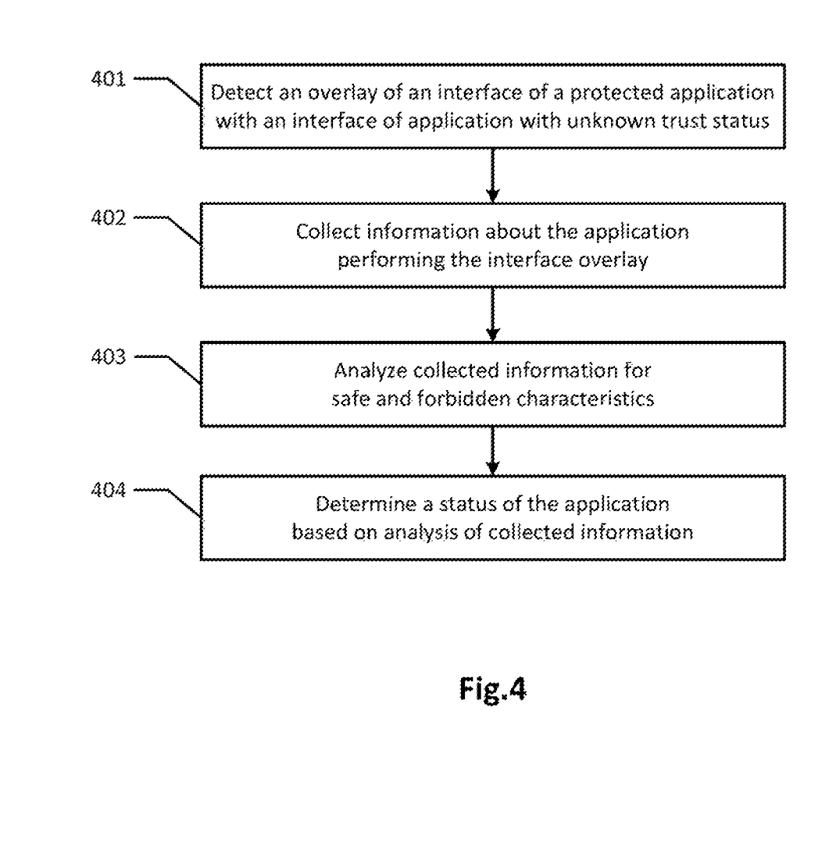
FIG. 4 illustrates a block diagram of an example method for determining category of trust of software applications performing interface overlay according to another aspect.

FIG. 4 shows an example method for determining category of trust of software applications performing interface overlay according to another aspect. In step 401, the protected application may detect an overlay of its interface elements by interface elements of an application whose status may be unknown, where the application with unknown status may include an application whose status is not found in the database 204. Next, in step 402, information may be collected regarding the application with unknown status. In step 403, the collected information may be analyzed by comparing the information about the application whose status is unknown with information from the database 204 indicating forbidden and safe characteristics for applications overlaying the interface of the protected application. The forbidden characteristics may include the characteristics which the overlaying application may not have, and the safe characteristics may include characteristics whose presence in a the overlaying application are permissible. In step 404, the status of the application performing the overlay of the protected application may be determined. In one example aspect, the application overlaying the interface of the protected application whose characteristics according to the results of a comparison are similar to the forbidden characteristics may be assigned the status of dangerous, and the status may be stored in the database 204. In another example aspect, an application whose characteristics are not similar to forbidden characteristics may be assigned the status of safe, and the characteristics based on the results of the comparison may be considered to be similar if the degree of similarity between the characteristics exceeds a given threshold. In yet another example aspect, the degree of similarity may be determined in accordance with the Dice metric, or the degree of similarity may be determined in accordance with one of the metrics: Hemming, Lowenstein or Jaccard.

In one example aspect, the analysis module 206 of the protected application 201 may compare the characteristics of at least one interface element of the unknown application performing the Interface overlay with the characteristics of interface elements stored in the database 204, which are forbidden to overlay of the interface elements of the protected application. The forbidden interface elements may be selected based on the type of protected application, which may be determined, for example, based on the purpose of the application.

Figure 5:
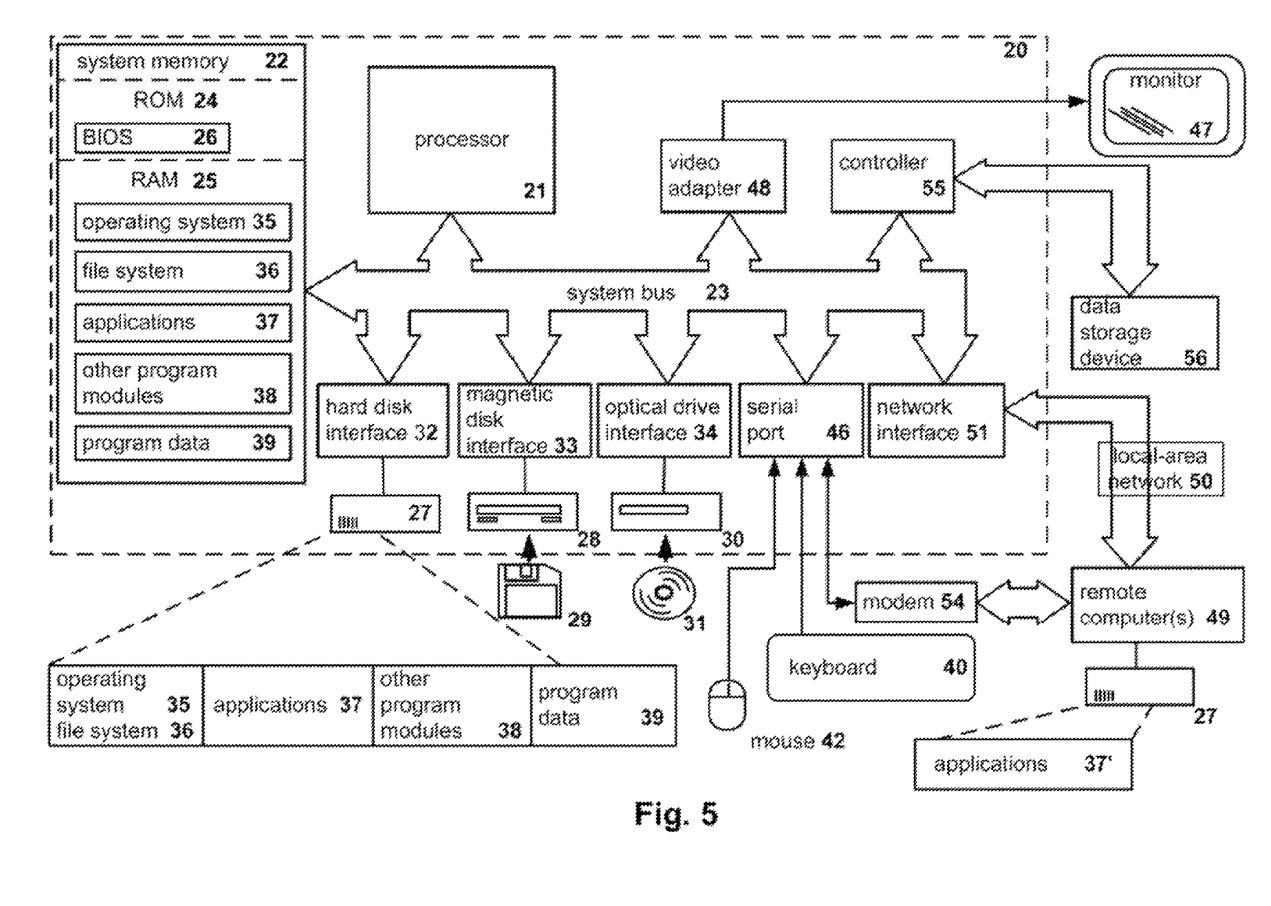
FIG. 5 shows an example of a general-purposes computer system, such as a personal computer or a server, suitable for implementing the disclosed aspects of systems and method for determining category of trust of software applications performing interface overlay according to one aspect.

FIG. 5 shows an example of a general-purpose computer system (which may be a personal computer or a server) 20, which may be used to implement system and methods for determining category of trust of software applications performing interface overlay disclosed herein. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the computer 20, such as those at the time of loading the operating system with the use of the ROM 24.

The computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer 20.

The computer 20 may include one or more hard disk drives 27, removable magnetic disks 29 and removable optical disks 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is stored, and also additional program applications 37, other program modules 38 and program data 39. The user is able to enter commands and information into the computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The computer 20 is able to work in a network environment, using a network connection to one or more remote computers 49. The remote computer (or computers) 49 may also be personal computers or servers having the majority or all of the aforementioned elements in describing the nature of the computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the computer 20 is connected to the local-area network 50 across a network adapter or network interface 51. When networks are used, the computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for determining category of trust of software applications, comprising:
monitoring, by a hardware processor, a first application to detect an overlay of at least one interface element of the first application by at least one interface element of a second application;
collecting information about the second application, wherein the information includes at least a danger status of the second application, wherein the danger status determines a danger caused by the second application to the first application;
upon determining that the danger status of the second application is unknown, collecting and comparing information relating to characteristics of the second application with information relating to forbidden and safe characteristics of known applications, and determining a degree of similarity between the information relating to characteristics of the second application and the information relating to forbidden and safe characteristics;
determining a category of trust of the second application based at least in part on the degree of similarity; and
determining, based on the category of trust of the second application, whether to allow or prohibit overlay of the at least one interface element of the first application by the at least one interface element of the second application.

2. The method of claim 1, wherein the monitoring of the first application comprises:
detecting an overlay of at least one active interface element of the first application by the at least one interface element of the second application; and
detecting the overlay by comparing information relating to a window of the first application with information relating to an active window in a system log of an operating system.

3. The method of claim 1, wherein the danger to the first application caused by the second application includes at least one of: stealing of data being processed by the first application and replacing of the data being inputted by a user into the first application.

4. The method of claim 1, wherein the analysis of the collected information comprises:
determining the second application as trusted when the second application has a safe status; and
determining the second application as untrustworthy when the second application has a dangerous status.

5. The method of claim 1, wherein the analysis of the collected information comprises:
determining whether the second application is a system application; and
when the second application is a system application, determining the second application as trusted.

6. A system for determining category of trust of software applications, comprising:
a hardware processor configured to:
monitor a first application to detect an overlay of at least one interface element of the first application by at least one interface element of a second application;
collect information about the second application, wherein the information includes at least a danger status of the second application, wherein the danger status determines a danger caused by the second application to the first application;
upon determining that the danger status of the second application is unknown, collect and compare information relating to characteristics of the second application with information relating to forbidden and safe characteristics of known applications, and determining a degree of similarity between the information relating to characteristics of the second application and the information relating to forbidden and safe characteristics;
determine a category of trust of the second application based at least in part on the degree of similarity; and
determine, based on the category of trust of the second application, whether to allow or prohibit overlay of the at least one interface element of the first application by the at least one interface element of the second application.

7. The system of claim 6, wherein the monitoring of the first application comprises:
detecting an overlay of at least one active interface element of the first application by the at least one interface element of the second application; and
detecting the overlay by comparing information relating to a window of the first application with information relating to an active window in a system log of an operating system.

8. The system of claim 6, wherein the danger to the first application caused by the second application includes at least one of: stealing of data being processed by the first application and replacing of the data being inputted by a user into the first application.

9. The system of claim 6, wherein the analysis of the collected information comprises:
  determining the second application as trusted when the second application has a safe status; and
  determining the second application as untrustworthy when the second application has a dangerous status.

10. The system of claim 6, wherein the collecting of information comprises:
  determining whether the second application is a system application; and
  when the second application is a system application, determining the second application as trusted.

11. A computer program product stored on a non-transitory computer-readable storage medium, the computer program product comprising computer-executable instructions for determining category of trust of software applications, comprising instructions for:
  monitoring a first application to detect an overlay of at least one interface element of the first application by at least one interface element of a second application;
  collecting information about the second application, wherein the information includes at least a danger status of the second application, wherein the danger status determines a danger caused by the second application to the first application;
  upon determining that the danger status of the second application is unknown, collecting and comparing information relating to characteristics of the second application with information relating to forbidden and safe characteristics of known applications, and determining a degree of similarity between the information relating to characteristics of the second application and the information relating to forbidden and safe characteristics;
  determining a category of trust of the second application based at least in part on the degree of similarity; and
  determining, based on the category of trust of the second application, whether to allow or prohibit overlay of the at least one interface element of the first application by the at least one interface element of the second application.

12. The computer program product of claim 11, wherein the monitoring of the first application comprises:
  detecting an overlay of at least one active interface element of the first application by the at least one interface element of the second application; and
  detecting the overlay by comparing information relating to a window of the first application with information relating to an active window in a system log of an operating system.

13. The computer program product of claim 11, wherein the danger to the first application caused by the second application includes at least one of: stealing of data being processed by the first application and replacing of the data being inputted by a user into the first application.

14. The computer program product of claim 11, wherein the analysis of the collected information comprises:
  determining the second application as trusted when the second application has a safe status; and
  determining the second application as untrustworthy when the second application has a dangerous status.

15. The computer program product of claim 11, wherein the collecting of information comprises:
  determining whether the second application is a system application; and
  when the second application is a system application, determining the second application as trusted.

* * * * *